US010807604B2

(12) United States Patent
Kim

(10) Patent No.: US 10,807,604 B2
(45) Date of Patent: Oct. 20, 2020

(54) VEHICLE AND METHOD FOR CONTROLLING THEREOF

(71) Applicants: Hyundai Motor Company, Seoul (KR); Kia Motors Corporation, Seoul (KR)

(72) Inventor: Donghyuk Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 60 days.

(21) Appl. No.: 16/207,571

(22) Filed: Dec. 3, 2018

(65) Prior Publication Data
US 2020/0079386 A1     Mar. 12, 2020

(30) Foreign Application Priority Data
Sep. 11, 2018  (KR) .................. 10-2018-0108292

(51) Int. Cl.
*G06F 7/70*       (2006.01)
*B60W 40/09*    (2012.01)
(Continued)

(52) U.S. Cl.
CPC ............ B60W 40/09 (2013.01); B60W 10/04 (2013.01); B60W 10/18 (2013.01); G06K 9/00798 (2013.01); G06K 9/00805 (2013.01); G06K 9/00845 (2013.01); B60Q 9/00 (2013.01); B60R 1/00 (2013.01); B60W 2040/0818 (2013.01); B60W 2420/42 (2013.01); B60W 2540/26 (2013.01); B60W 2540/30 (2013.01);
(Continued)

(58) Field of Classification Search
CPC ...... B60W 40/09; B60W 10/04; B60W 10/18; B60W 2252/30; B60W 2254/00; B60W 2552/05; B60W 2540/26; B60W 2720/106; B60W 2710/18; B60W 2420/42; B60W 2040/0818; B60W 2540/30; G06K 9/00845; G06K 9/00798; G06K 9/00805; G06K 2209/23; B60Q 9/00; B60R 1/00; G06F 7/70
USPC ............ 701/70, 1, 23, 48, 36; 340/438, 903; 707/736
See application file for complete search history.

(56) References Cited

U.S. PATENT DOCUMENTS

| 6,772,057 B2 * | 8/2004 | Breed ............... G06K 9/00832 701/45 |
| 9,238,467 B1 * | 1/2016 | Hoye .................... B60W 50/14 |

(Continued)

FOREIGN PATENT DOCUMENTS

KR  10-2018-0048097 A    5/2018

*Primary Examiner* — Shardul D Patel
(74) *Attorney, Agent, or Firm* — Mintz Levin Cohn Ferris Glovsky and Popeo, P.C.; Peter F. Corless

(57) ABSTRACT

A vehicle may include: a sensor configured to detect an object in a vicinity of the vehicle; a driver state detector configured to identify a driver state of a driver of the vehicle; and a controller operably coupled to the sensor and the driver state detector, the controller configured to determine whether the driver is incapable of controlling the vehicle based on the identified driver state, and to determine a driving stop position and a driving stop timing based on at least one of a type of a road on which the vehicle is driving and a driving environment of the vehicle when it is determined that the driver is incapable of controlling the vehicle.

16 Claims, 11 Drawing Sheets

(51) Int. Cl.
  B60W 10/04 (2006.01)
  G06K 9/00 (2006.01)
  B60W 10/18 (2012.01)
  *B60W 40/08* (2012.01)
  *B60R 1/00* (2006.01)
  *B60Q 9/00* (2006.01)

(52) U.S. Cl.
  CPC ..... *B60W 2552/05* (2020.02); *B60W 2552/30* (2020.02); *B60W 2554/00* (2020.02); *B60W 2710/18* (2013.01); *B60W 2720/106* (2013.01); *G06K 2209/23* (2013.01)

(56) References Cited

U.S. PATENT DOCUMENTS

| | | | |
|---|---|---|---|
| 2014/0067801 A1* | 3/2014 | Marvit | G06F 16/29 707/736 |
| 2015/0211868 A1* | 7/2015 | Matsushita | G08G 1/166 701/457 |
| 2016/0001781 A1* | 1/2016 | Fung | G16H 50/20 701/36 |
| 2017/0032676 A1* | 2/2017 | Mesmakhosroshahi | G06K 9/00369 |
| 2017/0212525 A1* | 7/2017 | Wang | G01C 21/3492 |
| 2017/0297566 A1* | 10/2017 | Matsumura | B60W 40/072 |
| 2018/0015828 A1* | 1/2018 | McNew | B60W 50/14 |
| 2018/0308353 A1* | 10/2018 | He | B60K 28/066 |
| 2018/0329418 A1* | 11/2018 | Baalke | G08G 1/00 |
| 2019/0099118 A1* | 4/2019 | Patel | G07C 5/008 |
| 2019/0241189 A1* | 8/2019 | Odate | B60L 1/00 |

* cited by examiner

VEHICLE AND METHOD FOR CONTROLLING THEREOF

CROSS-REFERENCE TO RELATED APPLICATION

This application is based on and claims priority under 35 U.S.C. § 119 to Korean Patent Application No. 10-2018-0108292, filed on Sep. 11, 2018 in the Korean Intellectual Property Office, the disclosure of which is incorporated by reference herein in its entirety.

BACKGROUND

1. Technical Field

Embodiments of the present disclosure relate to a vehicle and a method for controlling thereof, and more particularly, to a vehicle capable of automatically making an emergency stop in light of traffic conditions, a road type, or the like, and a method for controlling thereof.

2. Description of Related Art

With the recent proliferation of vehicles, traffic congestion has deteriorated particularly in high-density area, e.g., South Korea. Meanwhile, many modern vehicles are equipped with an Advanced Driver Assistance System (ADAS) that actively provides information about vehicle condition, driver condition, and information regarding the surrounding environment in order to reduce the burden on drivers and improve user convenience. A typical ADAS may include a Smart Cruise Control System, Lane Keeping Assist System, Lane Following Assist, Lane Departure Warning System, Forward Collision Avoidance (FCA), and Autonomous Emergency Brake (AEB).

Some implementations of the ADAS can assist the driver in avoiding collisions through emergency braking by identifying a risk of collision with an opposing vehicle or an intersecting vehicle, maintaining a distance from a proceeding vehicle, and/or preventing lane departure of the vehicle. In addition, the system may include driver state warnings that monitor a driver's state to detect if the driver appears distracted or drowsy while drowsy. Along these lines, there is a need for automatically performing an emergency vehicle stop when the driver is unable to drive for various reasons.

SUMMARY

Therefore, it is an aspect of the present disclosure to provide a vehicle capable of emergency stopping in light of traffic conditions, a road type, and the like when the driver is incapable of driving, and a method for controlling thereof.

Additional aspects of the present disclosure will be set forth in part in the description which follows and, in part, will be apparent from the description, or may be learned by practice of the present disclosure.

In accordance with embodiments of the present disclosure, a vehicle may include: a sensor configured to detect an object in a vicinity of the vehicle; a driver state detector configured to identify a driver state of a driver of the vehicle; and a controller operably coupled to the sensor and the driver state detector, the controller configured to determine whether the driver is incapable of controlling the vehicle based on the identified driver state, and to determine a driving stop position and a driving stop timing based on at least one of a type of a road on which the vehicle is driving and a driving environment of the vehicle when it is determined that the driver is incapable of controlling the vehicle.

The driver state detector may acquire gaze information of the driver, and the controller may determine a risk of inattention by the driver with respect to a road ahead of the vehicle based the acquired gaze information, and to determine a vehicle control state of the driver based on the determined risk.

The vehicle may further include an imager configured to image the road on which the vehicle is driving, wherein the controller may determine whether the road on which the vehicle is driving is an expressway or a general road based on map information of the road on which the vehicle is driving or imaged road information generated by the imager.

The controller may identify the driving environment of the vehicle based on at least one of traffic congestion of the road on which the vehicle is driving and a shape of the road on which the vehicle is driving.

The controller may detect the traffic congestion based on whether a number of other vehicles in the vicinity of the vehicle, as detected by the sensor, is greater than or equal to a preselected number, and determine a driving stop control timing of the vehicle based on the detected traffic congestion.

The controller may perform driving stop control of the vehicle when the number of other vehicles in the vicinity of the vehicle is greater than or equal to the preselected number, and determine the driving stop control timing of the vehicle based on the shape of road on which the vehicle is driving when the number of other vehicles in the vicinity of the vehicle is less than the preselected number.

The controller may determine whether a curvature of the road on which the vehicle is driving is less than a preselected curvature, and perform the driving stop control of the vehicle when the curvature of the road on which the vehicle is driving is less than the preselected curvature.

The controller may perform driving stop control of the vehicle, causing the vehicle to stop at an intersection, when the road on which the vehicle is driving is a general road.

Furthermore, in accordance with embodiments of the present disclosure, a method for controlling a vehicle may include: detecting an object in a vicinity of the vehicle using a sensor; identifying a driver state of a driver of the vehicle using a driver state detector; determining, by a controller operably coupled to the sensor and the driver state detector, whether the driver is incapable of controlling the vehicle based on the identified driver state; and determining, by the controller, a driving stop position and a driving stop timing based on at least one of a type of a road on which the vehicle is driving and a driving environment of the vehicle when it is determined that the driver is incapable of controlling the vehicle.

The method may further include acquiring gaze information of the driver using the driver state detector; and determining, by the controller, a risk of inattention by the driver with respect to a road ahead of the vehicle based the acquired gaze information, and to determine a vehicle control state of the driver based on the determined risk.

The method may further include imaging the road on which the vehicle is driving using an imager; and determining, by the controller, whether the road on which the vehicle is driving is an expressway or a general road based on map information of the road on which the vehicle is driving or imaged road information generated by the imager.

The method may further include identifying, by the controller, the driving environment of the vehicle based on at least one of traffic congestion of the road on which the vehicle is driving and a shape of the road on which the vehicle is driving.

The method may further include detecting, by the controller, the traffic congestion based on whether a number of other vehicles in the vicinity of the vehicle, as detected by the sensor, is greater than or equal to a preselected number; and determining, by the controller, a driving stop control timing of the vehicle based on the detected traffic congestion.

The method may further include performing, by the controller, driving stop control of the vehicle when the number of other vehicles in the vicinity of the vehicle is greater than or equal to the preselected number; and determining, by the controller, the driving stop control timing of the vehicle based on the shape of road on which the vehicle is driving when the number of other vehicles in the vicinity of the vehicle is less than the preselected number.

The method may further include determining, by the controller, whether a curvature of the road on which the vehicle is driving is less than a preselected curvature; and performing, by the controller, the driving stop control of the vehicle when the curvature of the road on which the vehicle is driving is less than the preselected curvature.

The method may further include performing, by the controller, driving stop control of the vehicle, causing the vehicle to stop at an intersection, when the road on which the vehicle is driving is a general road

BRIEF DESCRIPTION OF THE DRAWINGS

These and/or other aspects of the disclosure will become apparent and more readily appreciated from the following description of embodiments, taken in conjunction with the accompanying drawings of which.

Figure 1:
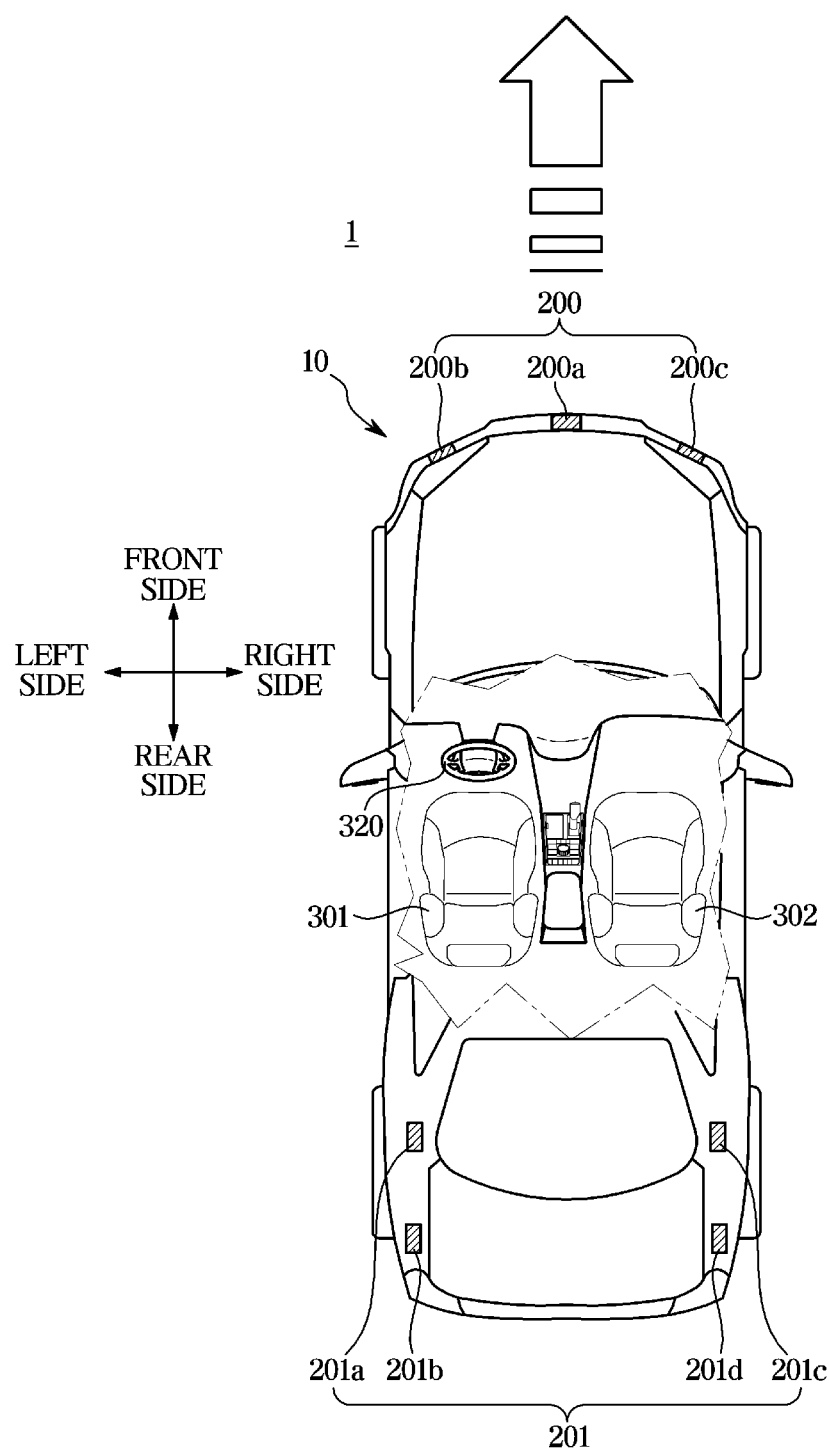
FIG. 1 is a view illustrating the vehicle provided with a sensor and a rear lateral side sensor according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

In the following description, like reference numerals refer to like elements throughout the specification. Well-known functions or constructions are not described in detail since they would obscure the one or more exemplar embodiments with unnecessary detail. Terms such as "unit", "module", "member", and "block" may be embodied as hardware or software. According to embodiments, a plurality of "unit", "module", "member", and "block" may be implemented as a single component or a single "unit", "module", "member", and "block" may include a plurality of components.

It will be understood that when an element is referred to as being "connected" another element, it can be directly or indirectly connected to the other element, wherein the indirect connection includes "connection via a wireless communication network".

Also, when a part "includes" or "comprises" an element, unless there is a particular description contrary thereto, the part may further include other elements, not excluding the other elements.

It will be understood that, although the terms first, second, third, etc., may be used herein to describe various elements, but is should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. The each step may be implemented in the order different from the illustrated order unless the context clearly indicates otherwise.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. The controller may control operation of units, modules, parts, devices, or the like, as described herein. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media containing executable program instructions executed by a processor. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Reference will now be made in detail to embodiments of the present disclosure, examples of which are illustrated in the accompanying drawings.

Figure 2:
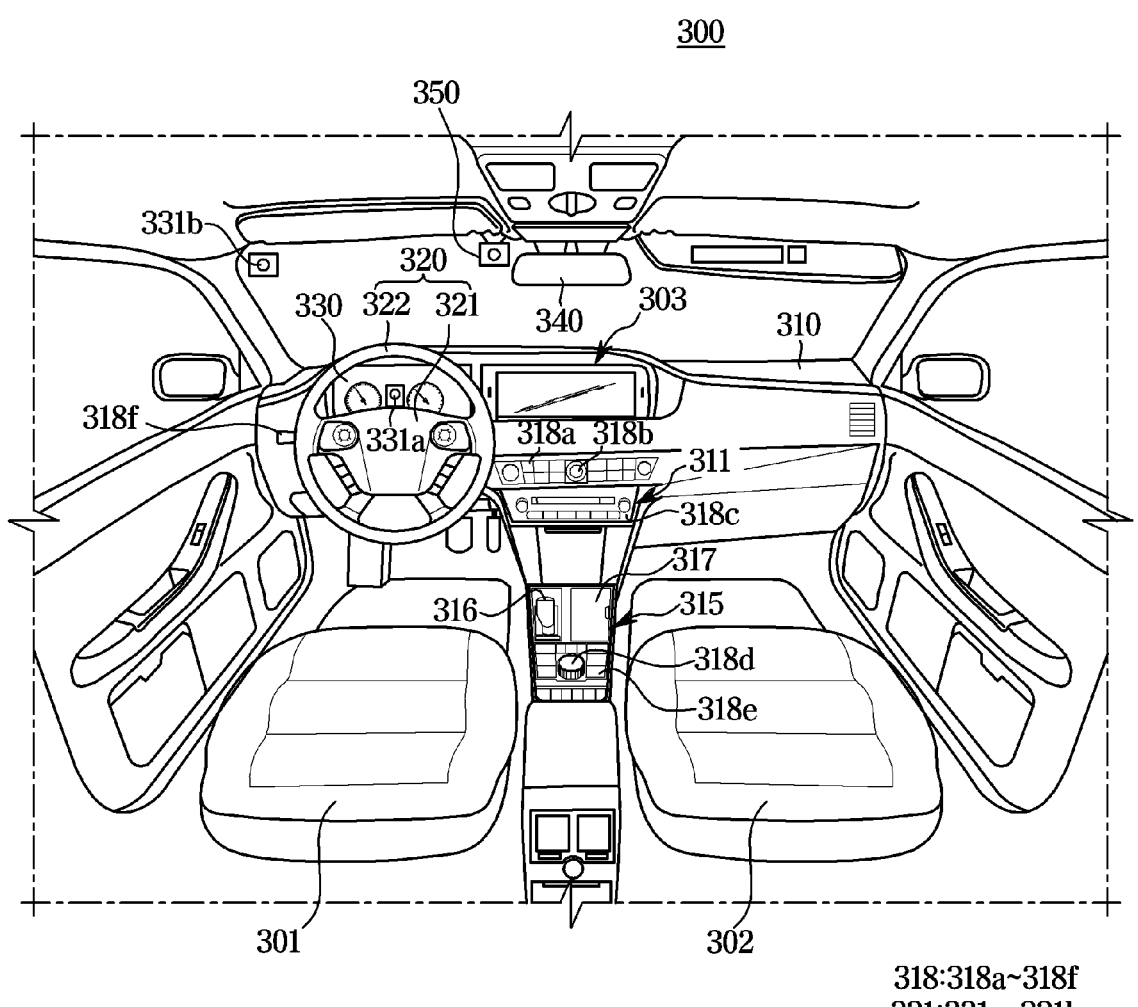
FIG. 2 is a view illustrating an interior configuration of the vehicle according to embodiments of the present disclosure
Figure 3:
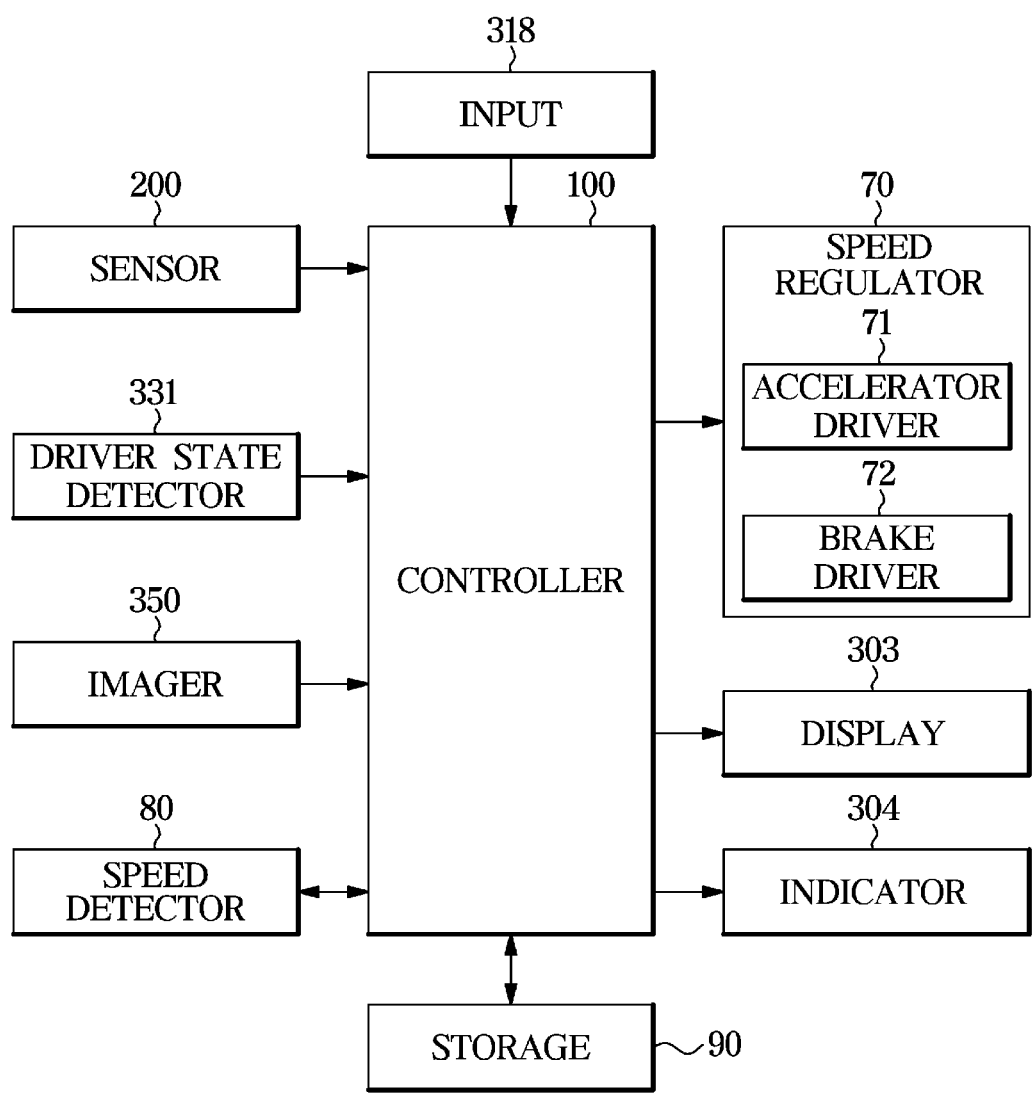
FIG. 3 is a control block diagram of the vehicle according to embodiments of the present disclosure.
Figure 4A:
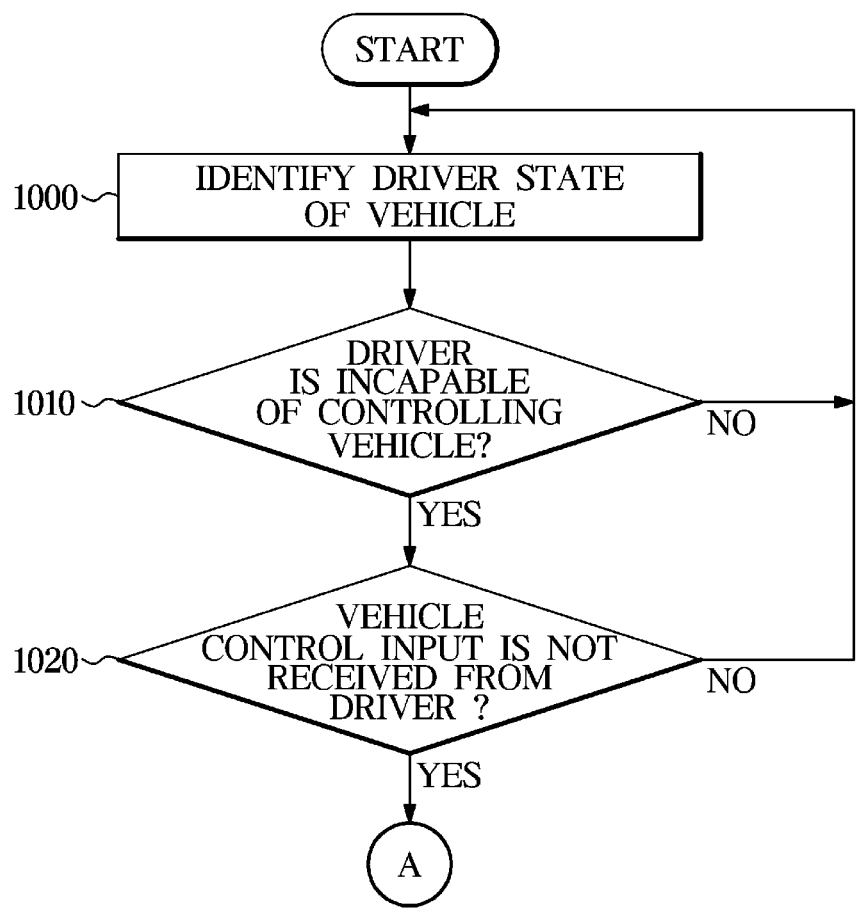
FIGS. 4A and 4B are flowcharts illustrating a method for controlling a vehicle according to embodiments of the present disclosure.
Figure 4B:
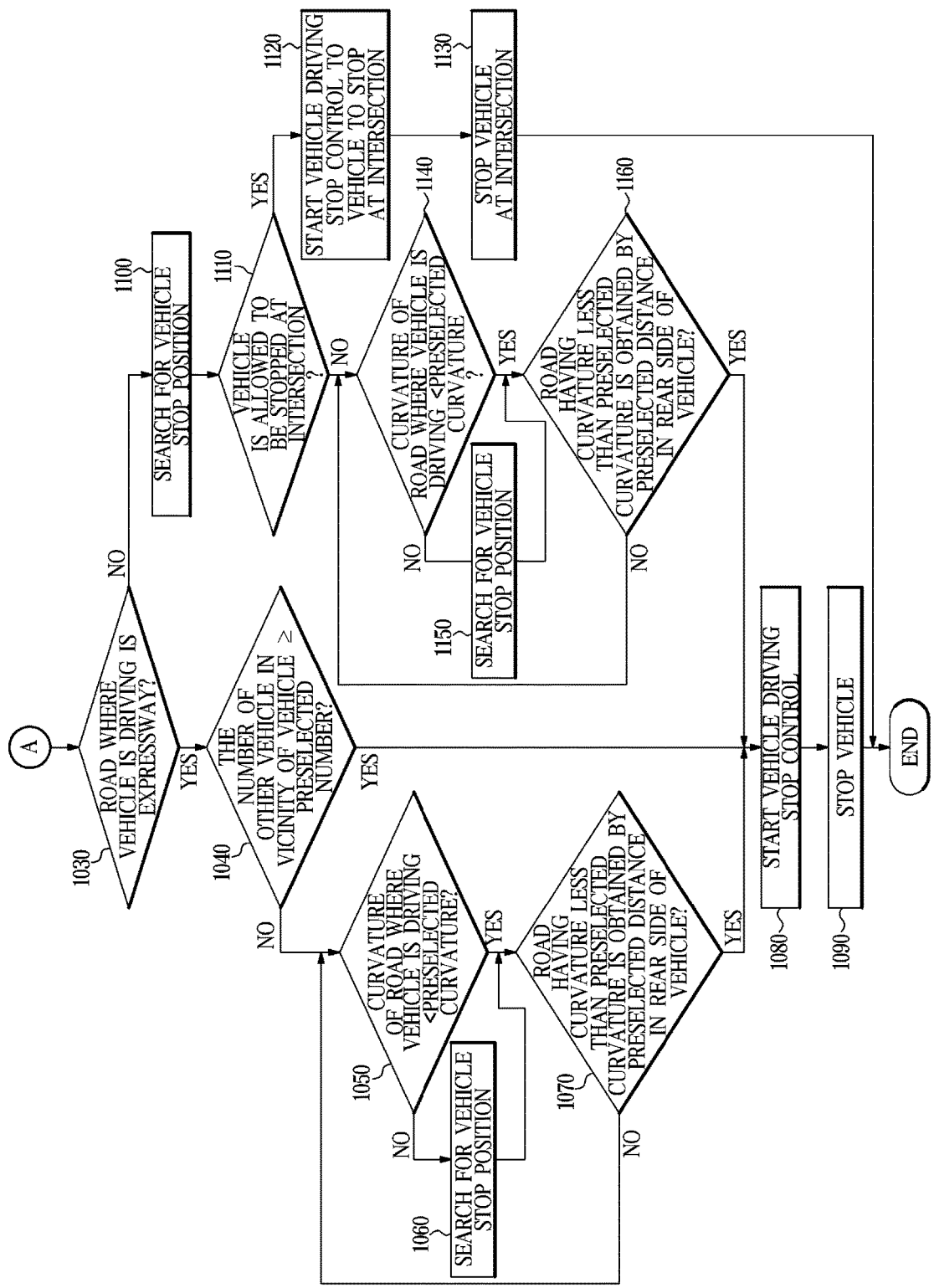

FIG. 1 is a view illustrating the vehicle provided with a sensor and a rear lateral side sensor according to embodiments of the present disclosure. FIG. 2 is a view illustrating an interior configuration of the vehicle according to embodiments of the present disclosure. FIG. 3 is a control block diagram of the vehicle according to embodiments of the present disclosure. FIGS. 4A and 4B are flowcharts illustrating a method for controlling a vehicle according to embodiments of the present disclosure.

Hereinafter for convenience of description, as illustrated in FIG. 1, a direction in which a vehicle 1 moves forward may be defined as the front side, and the left direction and the right direction may be defined with respect to the front side. When the front side is a 12 o'clock direction, a 3 o'clock direction or its periphery may be defined as the right direction and a 9 o'clock direction or its periphery may be defined as the left direction. A direction opposite to the front side may be defined as the rear side. A bottom direction with respect to the vehicle 1 may be defined as the lower side and a direction opposite to the lower side may be defined as the upper side. A surface disposed in the front side may be defined as a front surface, a surface disposed in the rear side may be defined as a rear surface, and a surface disposed in the lateral side may be defined as a side surface. A side surface in the left direction may be defined as a left surface and a side surface in the right direction may be defined as a right surface.

Referring to FIG. 1, a sensor 200 may be provided in a vehicle 1, wherein the sensor 200 is configured to detect an object in front of the vehicle 1 and acquire at least one piece of position information and driving speed information of the identified object.

According to embodiments of the present disclosure, the sensor 200 may acquire at least one piece of position information and driving speed information of the object, wherein the object is placed in the vicinity of the vehicle 1 with respect to the vehicle 1. That is, the sensor 200 may obtain coordinate information, which is changed as the object moves, in real time, and detect a distance between the vehicle 1 and the object.

A controller 100 (refer to FIG. 3) described later may calculate a relative distance and a relative speed between the vehicle 1 and the object based on the position and speed information of the object obtained by the sensor 200, and thus the controller 100 may calculate a time to collision (TTC) between the vehicle 1 and the object based on the obtained relative distance and relative speed.

As illustrated in FIG. 1, the sensor 200 may be installed in a position that is appropriate to recognize an object, e.g. other vehicle, in the front, lateral or front lateral side.

According to an embodiment, the sensor 200 may be installed in all of the front, the left and the right side of the vehicle 1 to recognize an object in all of the front side of the vehicle 1, a direction between the left side and the front side (hereinafter referred to as "front left side") of the vehicle 1 and a direction between the right side and the front side (hereinafter referred to as "front right side") of the vehicle 1.

For example, a first sensor 200a may be installed as a part of a radiator grill 6, e.g., inside of the radiator grill 6, or alternatively the first sensor 200a may be installed in any position of the vehicle 1 suitable for detecting another vehicle located ahead of the vehicle 1. However, according to an embodiment, it will be described that the first sensor 200a is installed in the center of the front surface of the vehicle. A second sensor 200b may be installed in the left side of the vehicle 1, and a third sensor 200c may be installed in the right side of the vehicle 1.

The sensor 200 may include a rear lateral side sensor 201 configured to detect a pedestrian or other vehicle that is present in or approaching from the rear side, lateral side or a direction between the lateral side and the rear side (hereinafter referred to as a rear lateral side). As illustrated in FIG. 1, the rear lateral side sensor 201 may be installed in a position that is appropriate to recognize an object, e.g. other vehicle, in the lateral side, rear side or rear lateral side.

According to embodiments of the present disclosure, the rear lateral side sensor 201 may be installed in both of the left and the right side of the vehicle 1 to recognize an object in all of a direction between the left side and the rear side (hereinafter referred to as "rear left side") of the vehicle 1 and a direction between the right side and the rear side (hereinafter referred to as "rear right side") of the vehicle 1. For example, a first rear lateral side sensor 201a or a second rear lateral side sensor 201b may be provided on the left surface of the vehicle 1, and a third rear lateral side sensor 201c or a fourth rear lateral side sensor 201d may be provided on the right surface of the vehicle 1.

The sensor 200 may be implemented by using a variety of devices, e.g., a radar using millimeter waves or microwaves, a Light Detection And Ranging (LiDAR) using pulsed laser light, a vision sensor using visible light, an infrared sensor using infrared light, or an ultrasonic sensor using ultrasonic waves. The sensor 200 may be implemented by using any one of the radar, the Light Detection And Ranging (LiDAR), the vision sensor, the infrared sensor, or the ultrasonic sensor or by combining them. When a plurality of sensors 200 is provided in a single vehicle 1, each sensor 200 may be implemented by using the same type of sensor or the different type of sensor. The implementation of the sensor 200 is not limited thereto, and the sensor 200 may be implemented by using a variety of devices and a combination thereof which is considered by a designer.

As illustrated in FIG. 2, at least one imager 350 may be provided inside the vehicle 1. While the vehicle 1 drives or while the vehicle 1 is stopped, the imager 350 may acquire a surrounding image of the vehicle 1, detect an object in the vicinity of the vehicle 1, and acquire information related to the type of the object and the position information of the object. The object obtained in the vicinity of the vehicle 1 may include other vehicle, a pedestrian, and a bicycle, and may include a moving object or a stationary obstacle.

The imager 350 may image the object around the vehicle 1 and obtain the shape of the object by identifying the imaged object through the image recognition, and the imager 350 may transmit the obtained information to the controller 100.

In addition, the imager 350 may image a road where the vehicle 1 drives, and acquire information on the shape of the road.

FIG. 2 illustrates that the imager 350 is disposed around a room mirror 340, but is not limited thereto. Therefore, the imager 350 may be disposed in any position as long as capable of acquiring image information by imaging the inside or the outside of the vehicle 1.

The imager 350 may include at least one camera, and the imager 350 may include a three-dimensional space recognition sensor, a radar sensor, or an ultrasonic sensor to acquire a more accurate image.

As shown in FIG. 2, in the interior 300 of the vehicle, a driver seat 301, a passenger seat 302, a dashboard 310 and a steering wheel 320, and an instrument panel 330 may be provided.

The dashboard 310 may represent a panel configured to divide the inside of vehicle 1 into the interior of the vehicle 1 and an engine compartment, and in which a variety of components required for the driving is installed. The dashboard 310 may be provided in the front side of the driver seat 301 and the passenger seat 302. The dashboard 310 may include an upper panel, a center fascia 311 and a gear box 315.

In the upper panel of the dashboard 310, the display 303 may be installed. The display 303 may provide a variety of information to a driver or a passenger of the vehicle 1, as an image. Further, the display 303 may provide a warning according to the risk, to the driver or the passenger. Particularly, when the vehicle 1 changes its lane, the display 303 may provide a warning to the driver, which varies according to the risk. The display 303 may be implemented by using a navigation system that is commonly used.

In addition, the display 303 may output an image about an object in the rear of the vehicle 1 detected by the rear lateral side sensor 201. Particularly, an image, which is about an object in the rear of the vehicle 1 imaged by a rear imager (not shown) provided in the rear of the vehicle 1, may be provided to a driver through the display 303.

In the dashboard 310, a variety of devices, e.g., a processor, a communication module, a GPS reception module, and a storage, may be installed. The processor installed in the vehicle 1 may be configured to control electronics installed in the vehicle 1, and as mentioned above, the processor may be provided to perform functions of the controller 100. The above mentioned devices may be implemented by using a variety of components, e.g., semiconductor chips, switches, integrated circuits, resistors, volatile or non-volatile memory or printed circuit boards.

The center fascia 311 may be provided in the center of the dashboard 310 and may be provided with an input 318a to 318c for receiving a variety of commands related to the vehicle. The input 318a to 318c may be implemented using a physical button, a knob, a touch pad, a touch screen, a stick-type operator or a track ball. The driver may control the various operations of the vehicle 1 by operating the input 318a to 318c.

The gear box 315 may be provided between the driver seat 301 and the passenger seat 302 in the lower end of the center fascia 311. In the gearbox 315, a gear 316, a console 317, and various inputs 318d 318e may be provided. The input 318d to 318e may be implemented using a physical button, a knob, a touch pad, a touch screen, a stick-type operator or a track ball. The console 317 and the input 318d to 318e may be omitted according to the embodiment.

The steering wheel 320 and the instrument panel 330 may be provided in the direction of the driver seat in the dashboard 310.

The steering wheel 320 may be rotatable in a certain direction corresponding to an operation of the driver, and the front vehicle wheel or the rear vehicle wheel of the vehicle 1 may be rotated corresponding to the rotation direction of the steering wheel 320 so that the vehicle 1 is steered. In the steering wheel 320, a spoke 321 connected to a rotational shift and a handle wheel 322 coupled to the spoke 321 may be provided. In the rear side of the steering wheel 320, a turn signal indicator input 318f may be provided. A user may input a signal to change a driving direction or a lane via the turn signal indicator input 318f during driving the vehicle 1.

The instrument panel 330 may be configured to provide a variety of information related to the vehicle to the driver, wherein the variety of information may include a speed of the vehicle 1, an engine speed, fuel residual amount, a temperature of engine oil or whether the turn signal indicator is flashed or not. The instrument panel 330 may be implemented using an illumination lamp or a scale plate or may be implemented using a display panel according to embodiments. When the instrument panel 330 is implemented using the display panel, the instrument panel 330 may display more various information, e.g., fuel consumption, whether various devices mounted on the vehicle 1 are performed or not, as well as the above mentioned information, for the driver. According to embodiments of the present disclosure, the instrument panel 330 may output a different warning to the driver according to the risk of the vehicle 1. Particularly, the instrument panel 330 may provide a different warning to the driver according to the identified risk when the vehicle 1 changes a lane.

In addition, the dashboard 330 may be provided with a driver state detector 331a configured to identify a driver's state. The driver state sensor 331 (including 331a and 331b) may identify a current state of the driver while driving the vehicle 1. The driver state detector 331 corresponds to a driver state warning system for monitoring a driver who is driving the vehicle 1 if the driver is inattention to the forward roadway (i.e., the driver takes his/her eyes off the road) or the driver is driving while drowsy.

For example, the driver state detector 331 may acquire driver's gaze information by acquiring at least one of the face angle and the pupil angle of the driver, and transmit the acquired driver's gaze information to the controller.

In addition, the driver state detector 331 may acquire a face image from the acquired image acquired by the camera, and identify a driver's state based on the acquired face image. That is, the driver state detector 331 may determine whether the driver keeps eyes forward or not and whether the driver is driving while drowsy or not.

That is, the driver state detector 331 may acquire the gaze information of the driver or image the driver's face or pupil to determine whether the driver keeps eyes forward, or whether the current driver's state is incapable of controlling the vehicle 1.

A method of identifying a current state of driver by the driver state detector 331 may be implemented in a variety of ways. According to embodiments of the present disclosure, it is described that the driver state detector 331a is provided in the instrument panel 330, but is not limited thereto. There is no limitation in a position where the driver state detector 331a is installed, and thus the driver state detector 331 may be installed at any position if the driver state detector 331 acquires drivers gaze information and driver's state information. That is, the driver state detector 331b may be installed at the upper end of driver's seat in the vehicle 1, as illustrated in FIG. 2.

The driver state detector 331 may include a stereo camera acquiring a face image of a driver or an image of a pupil, and may be installed at a position where the driver's face and pupil can be acquired to acquire driver's gaze information.

Referring to FIG. 3, the vehicle 1 may include, a speed regulator 70 regulating a driving speed of the vehicle 1 driven by a driver, a speed detector 80 detecting a driving speed of the vehicle 1, a storage 90 storing data related to the control of the vehicle 1, a controller 100 controlling each components of the vehicle 1 and the driving speed of the vehicle 1, and an indicator 304 transmitting information on an operation and driving of the vehicle 1 to a driver.

The speed regulator 70 may regulate the speed of the vehicle 1 driven by the driver. The speed regulator 70 may include an accelerator driver 71 and a brake driver 72.

The accelerator driver 71 may increase the speed of the vehicle 1 by operating the accelerator in response to the control signal of the controller 100. The brake driver 72 may reduce the speed of the vehicle 1 by operating the brake in response to the control signal of the controller 100.

That is, the controller 100 may calculate a time to collision between the vehicle 1 and the object based on a relative distance and a relative speed between the vehicle 1 and the object, and the controller 100 may transmit a signal controlling the driving speed of the vehicle 1 to the speed regulator 70 based on the estimated time to collision.

The speed regulator 70 may regulate the driving speed of the vehicle 1 under the control of the controller 100. When the risk of collision between the vehicle 1 and other object is high, the speed regulator 70 may reduce the driving speed of the vehicle 1.

The speed detector 80 may detect the driving speed of the vehicle 1 driven by the driver under the control of the controller 100. That is, the speed detector 80 may detect the driving speed by using a rotation speed of the vehicle wheel, wherein the driving speed may be expressed as [kph], and a distance (km) traveled per unit time (h).

The storage 90 may store various data related to the control of the vehicle 1. Particularly, according to embodiments of the present disclosure, the storage 90 may store information related to a driving speed, a driving distance, and a driving time of the vehicle 1 and the storage 90 may store the type and position information of the object detected by the imager 350. The storage 90 may store position information and speed information of the object detected by the sensor 200 and the rear lateral side sensor 201 and may store coordinates information of the moving object that is changed in real time. The storage 90 may store information related to the relative distance and the relative speed between the vehicle 1 and the object. In addition, the storage 90 may store data related to equations and control algorithms for controlling the vehicle 1, and the controller 100 may output a control signal controlling the vehicle 1 in accordance with this equations and control algorithm.

In addition, the storage 90 may store information on a road where the vehicle 1 is driving. For example, the storage 90 may store GPS information or map information of a road, and may store information on the type and the shape of the road where the vehicle 1 is driving and information on the type and the shape of the road where the vehicle 1 is to drive.

The storage 90 may be implemented using at least one of a non-volatile memory element, e.g., a cache, a Read Only Memory (ROM), a Programmable ROM (PROM), an Erasable Programmable ROM (EPROM), an Electrically Erasable Programmable ROM (EEPROM) and a flash memory, a volatile memory element, e.g., a Random Access Memory (RAM), or a storage medium, e.g., a Hard Disk Drive (HDD) and a CD-ROM. The implementation of the storage is not limited thereto. The storage 90 may be a memory that is implemented by a separate memory chip from the aforementioned processor related to the controller 100 or the storage may be implemented by a single chip with a processor.

At least one controller 100 may be provided inside the vehicle 1. The controller 100 may perform an electronic control on each component related to the operation of the vehicle 1.

When a driver's gaze is ahead of (or in front of) the vehicle, or when a driver is incapable of driving or controlling the vehicle 1 caused by the problem in the driver's health during the driver drives the vehicle, it may be required that the emergency stop is performed on the vehicle 1. According to a method for controlling the vehicle 1, it may be possible to determine an emergency stop control timing and stop position of the vehicle 1 by comprehensively considering the type and shape of the road where the vehicle 1 is driving and the traffic condition around the vehicle.

Referring to FIG. 4A, the driver state detector 331 provided in the vehicle 1 may identify a driver state of the vehicle 1 (1000).

Figure 5:
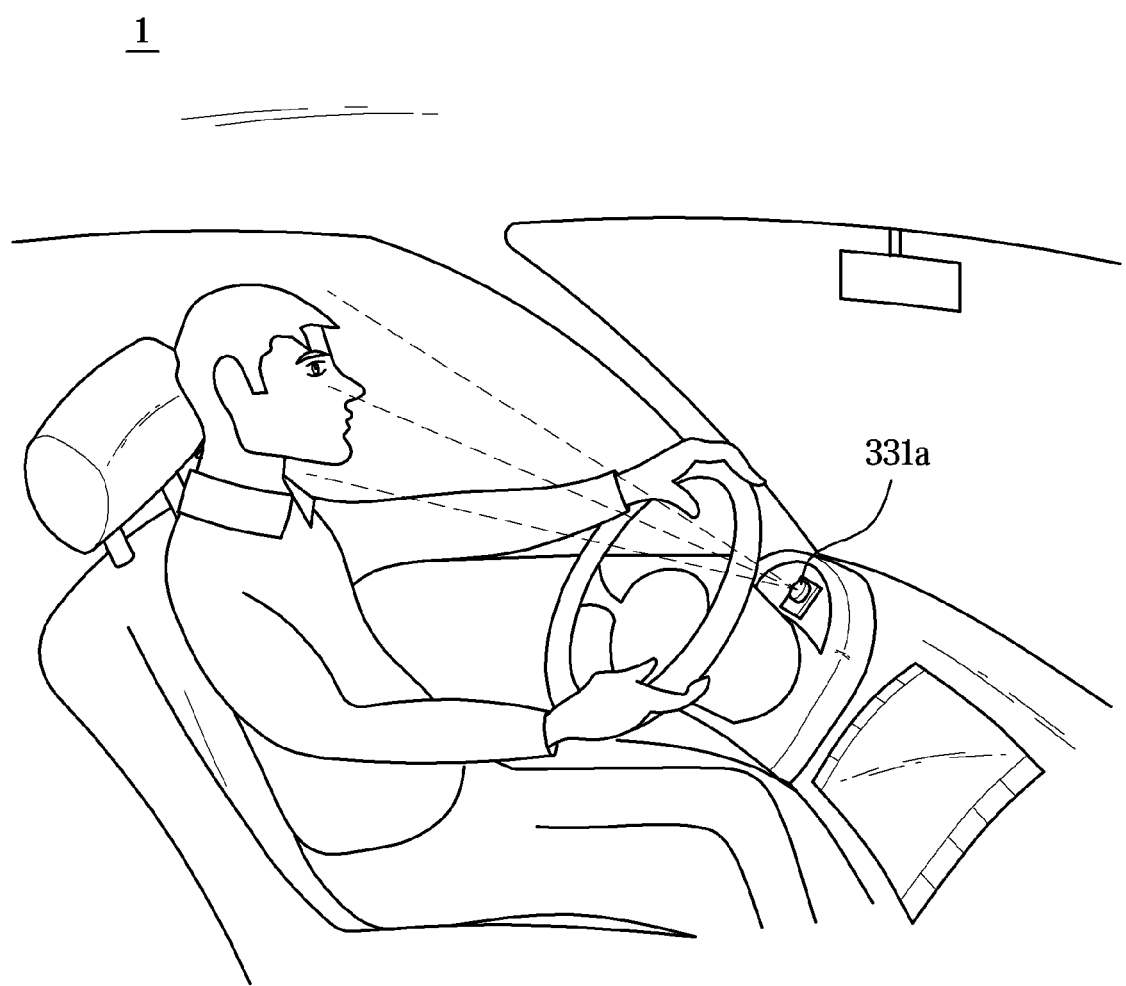
FIG. 5 is a view illustrating a case in which a driver state sensor acquires driver's gaze information according to embodiments of the present disclosure.
Figure 6:
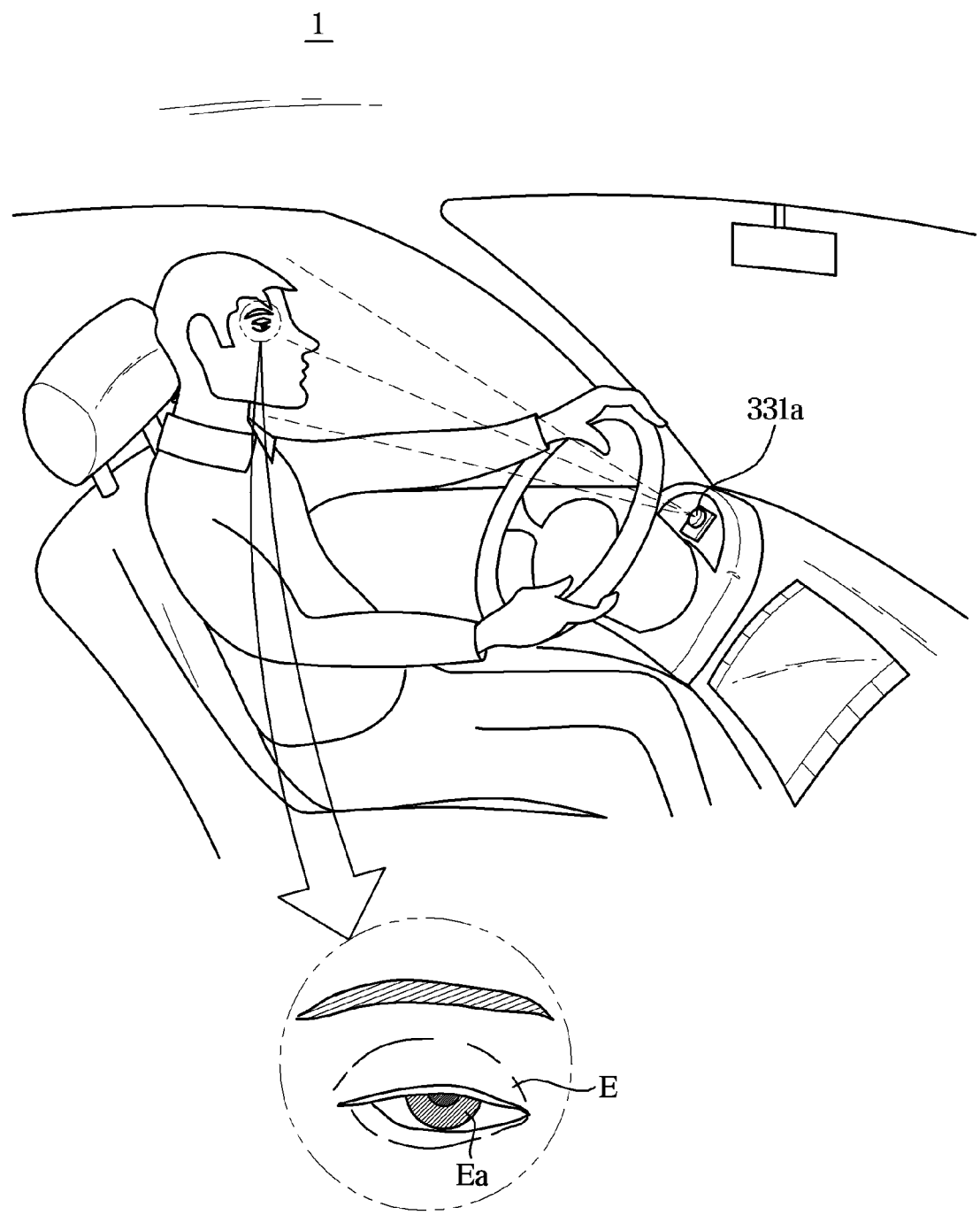
FIG. 6 is a view illustrating identifying driver's drowsiness while driving according to embodiments of the present disclosure.

FIG. 5 is a view illustrating a case in which a driver state sensor acquires driver's gaze information according to embodiments of the present disclosure, and FIG. 6 is a view illustrating identifying a driver's drowsiness while driving according to embodiments of the present disclosure.

As shown in FIG. 5, the driver state detector 331 may obtain the driver's gaze information. That is, the face or the eyes of the driver driving the vehicle 1 may be imaged through an imaging module such as a camera (not shown) provided in the driver state detector 331, and acquire information on the face angle, and pupil angle of the driver based on the acquired image. The camera may include a plurality of gaze sensors.

The controller 100 may determine a risk of a driver inattention to the forward roadway based on the driver gaze information acquired by the driver state detector 331 and identify a control state of the driver of the vehicle 1 based on the identified risk (1010).

Particularly, the controller 100 may detect whether the driver's gaze is out of a driving direction of the vehicle 1 at a pre-selected angle or more, and when it is identified that the driver's gaze is out of a driving direction of the vehicle 1 at the pre-selected angle or more, the controller 100 may determine the risk of the driver inattention to the forward roadway.

When the risk of the driver inattention to the forward roadway corresponds to a pre-selected value, the controller 100 may determine that the driver is incapable of driving the vehicle 1.

As shown in FIG. 6, the controller 100 may determine whether an area of the pupil (Ea) in an area of the eyeball (E) of the driver acquired by the driver state detector 331 is equal to or less than a preselected area, and when it is identified that the area of the pupil (Ea) is equal to or less than the preselected area, the controller 100 may determine that the driver is driving while drowsy. In addition, when it is identified that the driver is driving while drowsy, the controller 100 may determine the risk of the driver inattention to the forward roadway as the preselected value.

That is, as illustrated in FIG. 6, since the risk of an accident increases when the driver is driving while drowsy upon driving, the controller 100 may compare the area of the pupil (Ea) acquired by the driver state detector 331 with a preselected reference area stored in the storage 90, and when the area of the pupil (Ea) is equal to or less than the preselected reference area, the controller 100 may detect that the driver closes his or her eyes partially.

When the identified risk caused by the drowsy driving is equal to a preselected value, the controller 100 may determine that the current driver is incapable of driving the vehicle.

When it is identified that the current driver is incapable of controlling the vehicle, the controller 100 may determine whether a vehicle control input of the current driver is received or not (1020).

That is, when the input related to the control of the vehicle 1 is received from the driver, although the controller 100 identifies that the driver is incapable of controlling the vehicle 1, the controller 100 may release the identification related to that the driver is incapable of controlling the vehicle 1.

However, when the input related to the control of the vehicle 1 is not received from the driver, the controller 100 may determine that the driver is incapable of driving the vehicle 1 and thus the controller 100 may control the vehicle 1 to proceed with the emergency stop of the vehicle 1.

That is, when it is identified that the driver is incapable of controlling the vehicle 1, the controller 100 may determine a driving stop position and a driving stop timing of the vehicle 1 based on at least one of the type of the road where the vehicle 1 is driving, and the driving environment of the vehicle 1.

Figure 7:
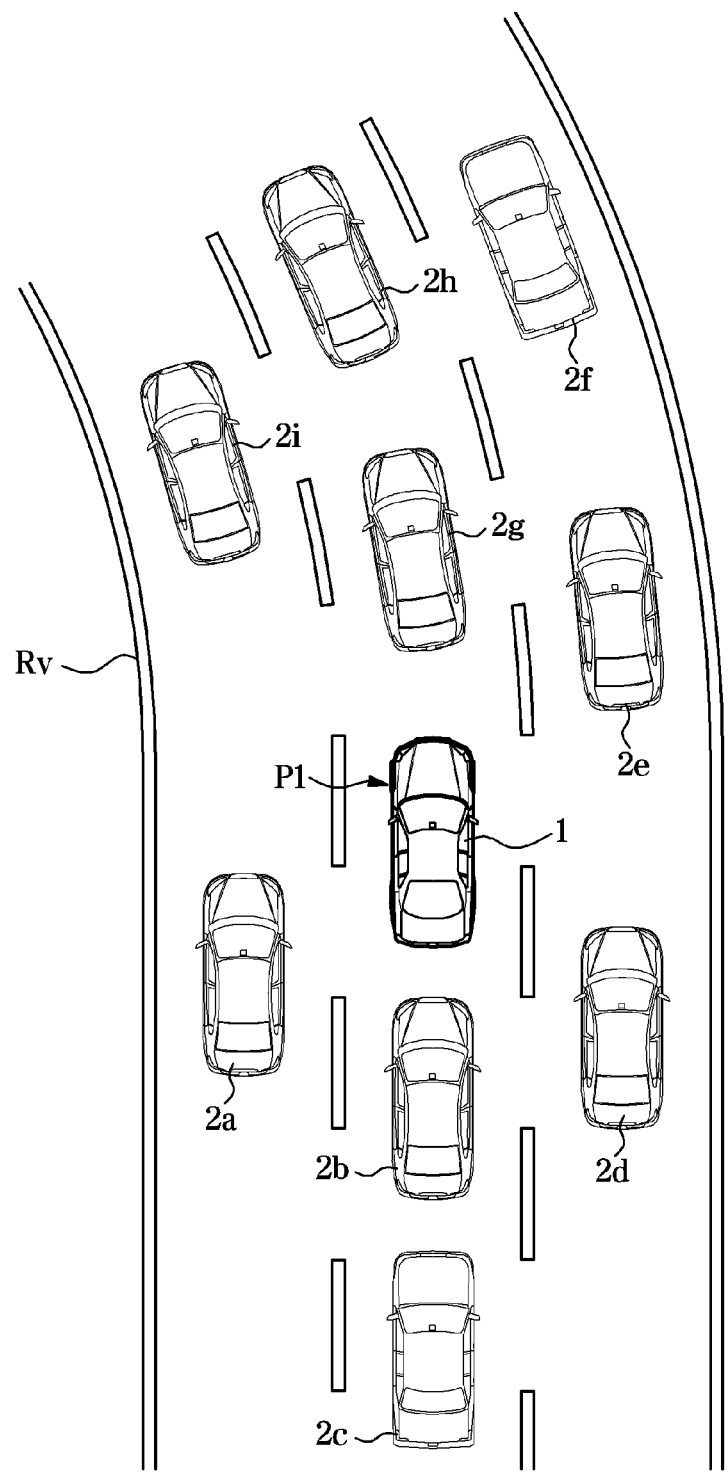
FIGS. 7 and 8 are views illustrating controlling an emergency stop of the vehicle on an expressway according to embodiments of the present disclosure.
Figure 8:
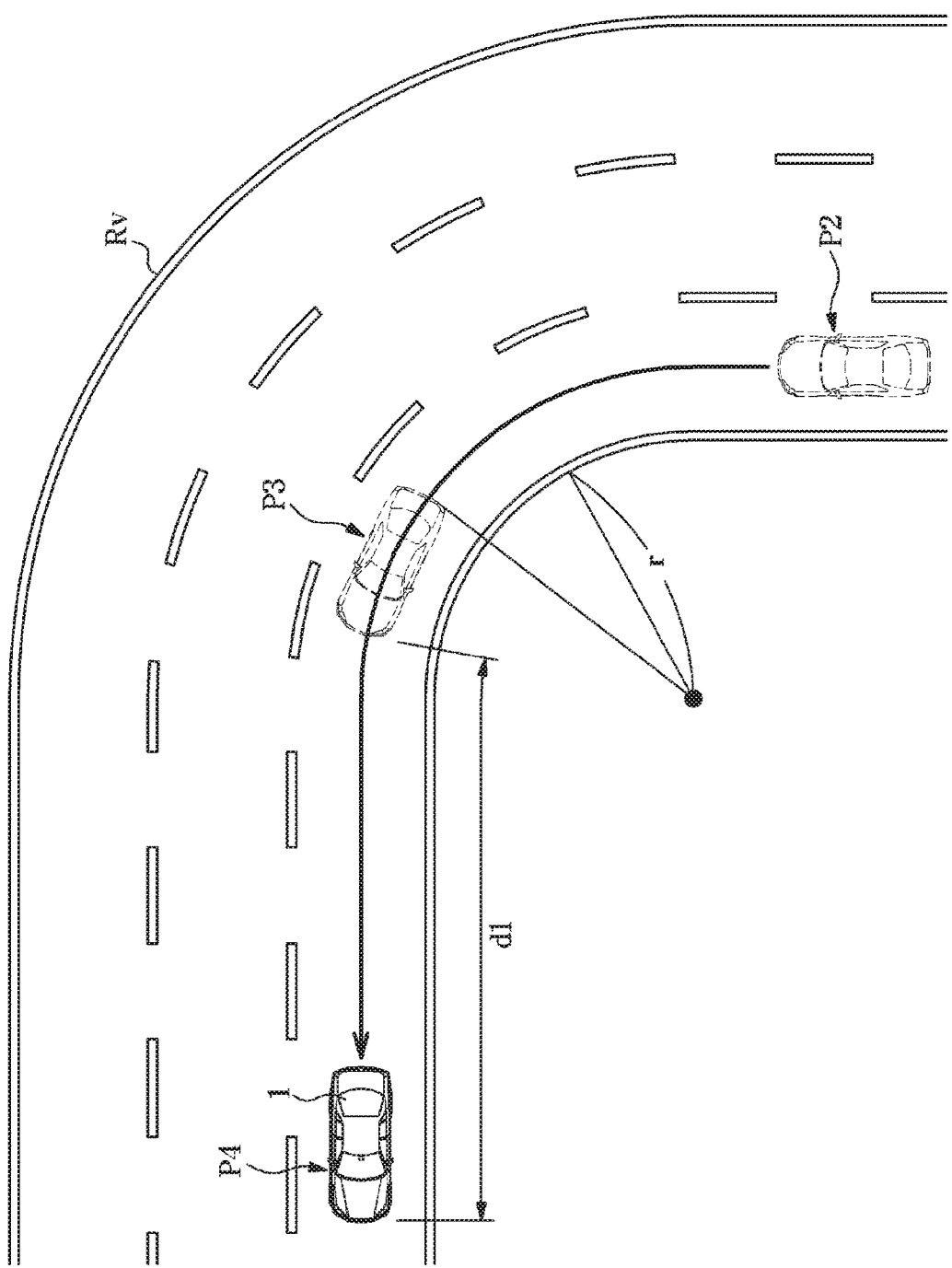
Figure 9:
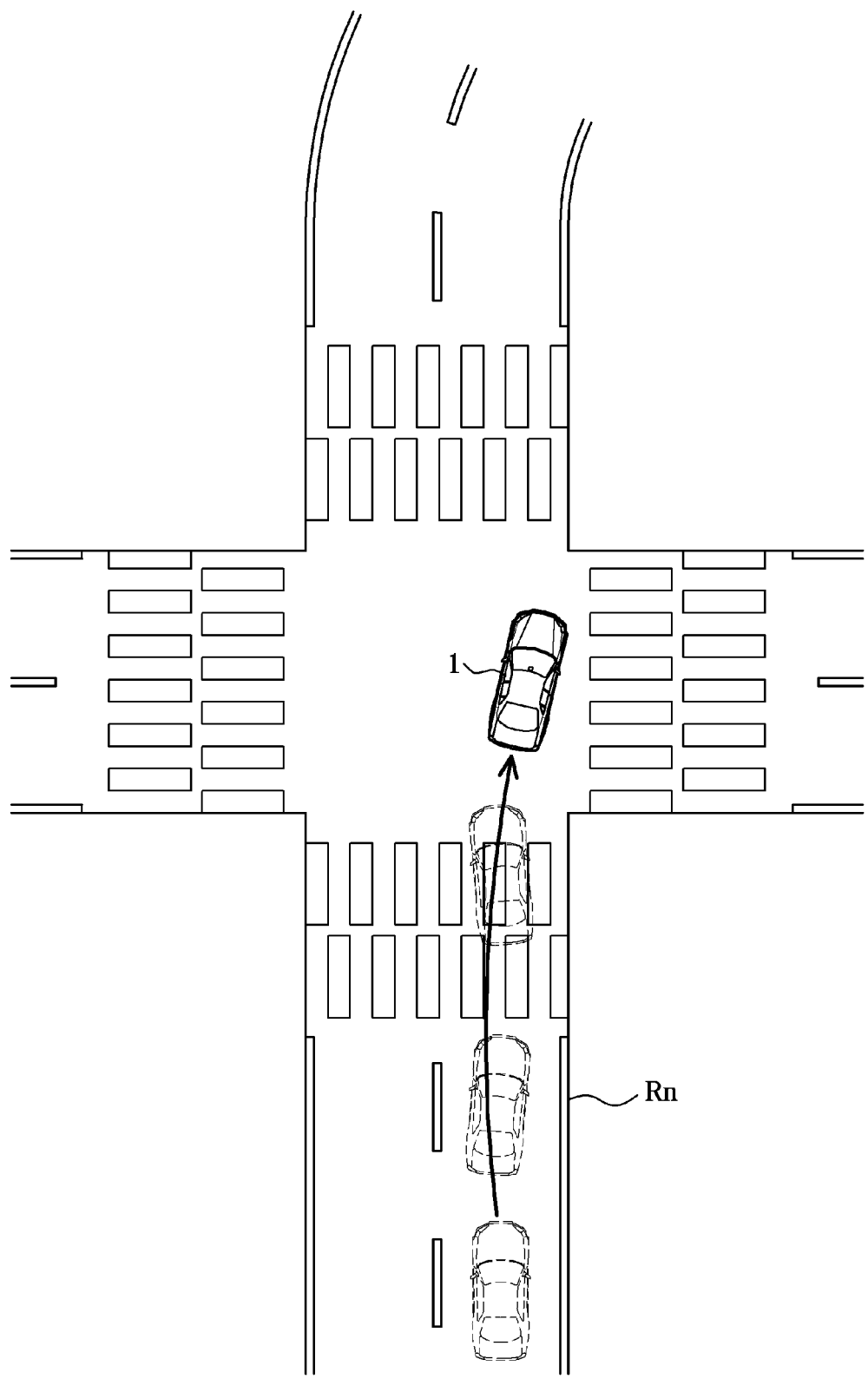
FIGS. 9 and 10 are views illustrating controlling an emergency stop of the vehicle on a general road according to embodiments of the present disclosure.
Figure 10:
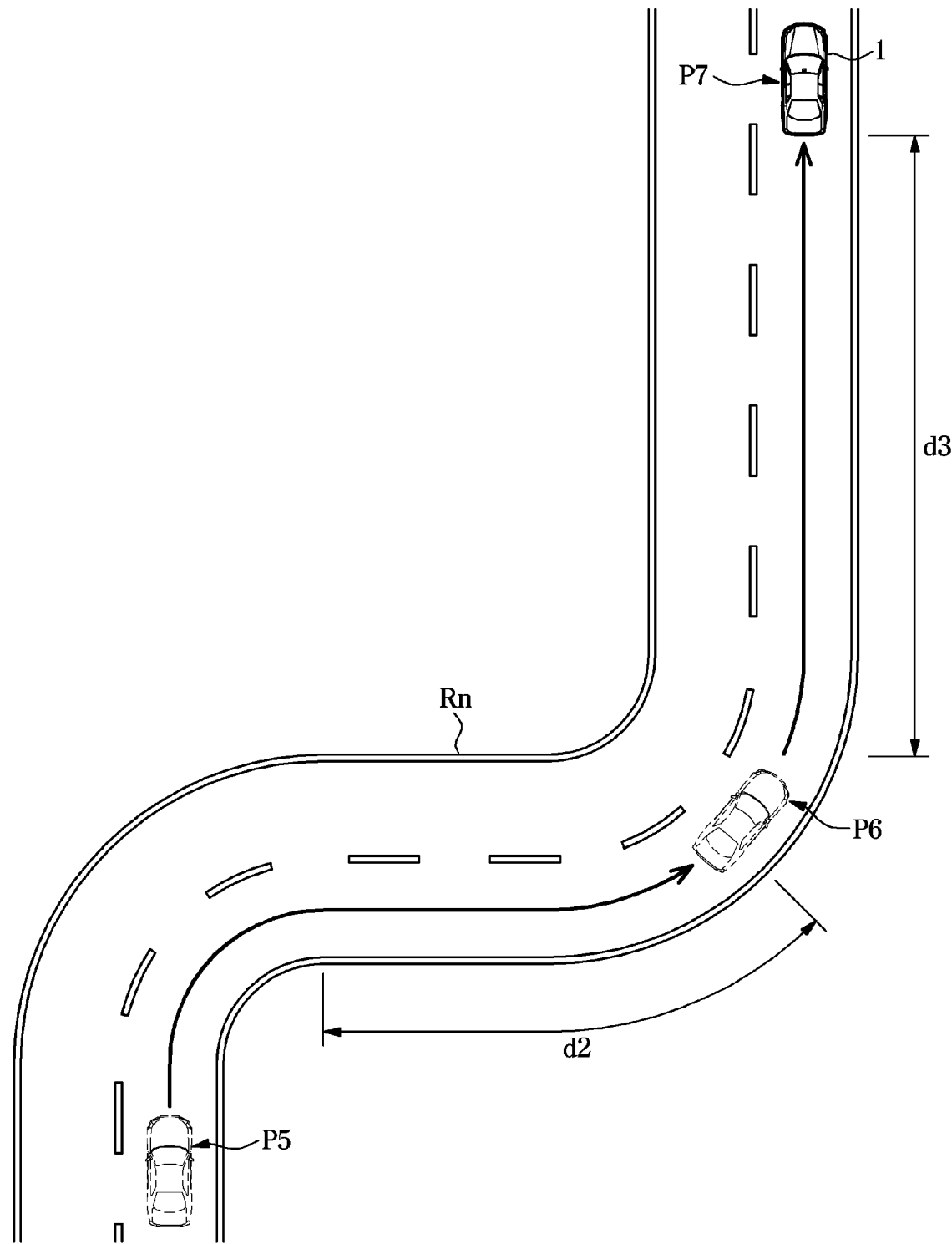

FIGS. 7 and 8 are views illustrating controlling an emergency stop of the vehicle on an expressway according to embodiments of the present disclosure and FIGS. 9 and 10 are views illustrating controlling an emergency stop of the vehicle on a general road according to embodiments of the present disclosure.

The controller 100 may detect the type of the road where the vehicle 1 is driving for the emergency stop of the vehicle 1 (1030). That is, the controller 100 may determine whether the road where the vehicle 1 is driving is an expressway or a general road, based on road information acquired by the imager 350 or map information of the road.

When the road where the vehicle 1 is driving is the expressway, only vehicle may drive thereon, and when the road where the vehicle 1 is driving is the general road, transportation other than a vehicle and a pedestrian may move thereon.

That is, since the type of the vehicle driving on the road and the traffic congestion in the road vary according to the type of the road where the vehicle 1 is driving, the controller 100 may control the emergency stop position and stop timing of the vehicle 1 to be variable.

When the road where the vehicle 1 is driving is the expressway, the controller 100 may determine the emergency stop position and stop timing of the vehicle 1, based on the traffic congestion in the road.

The controller 100 may detect the traffic congestion in the road where the vehicle 1 is driving, based on position and speed of adjacent vehicles acquired by the sensor 200. In addition, the controller 100 may detect the traffic congestion in the road, based on the number of the adjacent vehicles, and the traffic congestion may be identified based on a preselected number of other vehicles.

As illustrated in FIG. 7, when the controller 100 identifies that the driver is incapable of driving the vehicle 1, in a state in which the vehicle 1 is driving on a point P1 of the expressway (Rv), the controller 100 may determine a driving stop control timing depending on whether the number of other vehicles in the vicinity of the vehicle 1 is equal to or greater than the preselected number (1040).

For example, when other vehicle 2e, 2f, 2g, 2h, and 2i in the front of the vehicle 1 is more than three according to the preselected reference, and other vehicle 2a, 2b, 2c and 2d in the rear of the vehicle 1 is more than three according to the preselected reference, the controller 100 may use the preselected value as the traffic congestion of the road, and immediately start the driving stop control of the vehicle 1 based on the selected traffic congestion (1080). Accordingly, it may be possible to allow the vehicle 1 to be emergency stopped on the road (1090), wherein the vehicle 1 is driven by the driver who is incapable of controlling the vehicle 1.

That is, when the traffic congestion is high since the other vehicles are placed in vicinity of the vehicle 1, it may be required to perform emergency stop of the vehicle 1 to prevent the accident with the other vehicle caused by that the driver is incapable of controlling the vehicle 1. Therefore, the controller 100 may determine that driver is incapable of controlling the vehicle 1 and immediately start the driving stop control of the vehicle 1 upon acquiring the traffic congestion The controller 100 may determine a stop position of the vehicle 1 by controlling the steering of the vehicle 1 and reduce the driving speed of the vehicle 1 at a pre-selected deceleration by controlling the speed regulator 70.

Further, while performing the driving stop control of the vehicle 1, the controller 100 may control the driving of the vehicle 1, which is in the deceleration, based on LKAS, so as to prevent from being across other lane.

When the number of other vehicles in the vicinity of the vehicle 1 is less than the preselected reference value, the controller 100 may put off the stop timing without immediately starting the driving stop control of the vehicle 1, and search for a position for the emergency stop of the vehicle 1 by considering the shape of the road where the vehicle 1 is driving, and the driving environment.

That is, the controller 100 may acquire information on the type of the road where the vehicle 1 is driving based on road information acquired by the imager 350 or map information of the road, and may detect the driving environment of the vehicle 1 based on the acquired type of the road.

Particularly, the controller 100 may determine whether a curvature of the expressway (Rv) where the vehicle 1 is driving is less than a preselected curvature (1050), and when it is identified that the curvature of the road is equal to or greater than the preselected curvature, the controller 100 may search for other position where the vehicle 1 is allowed to be stopped, without stopping the vehicle 1 (1060).

On the other hand, when it is identified that the curvature of the expressway (Rv) is less than the preselected curvature, the controller 100 may determine whether a road having a curvature less than the preselected curvature is obtained by a preselected distance in the rear of the vehicle 1 (1070).

That is, when the vehicle 1 performs an emergency stop on the road having the large curvature in a state in which the driver is incapable of controlling the vehicle 1, the risk of collision with other vehicle may be increased. Therefore, in order to prevent the rear-end collision and the secondary accident, the controller 100 may put off the driving stop control timing until a road having a small curvature or a straight road is obtained by a preselected distance.

Referring to FIG. 8, when the driver is incapable of controlling the vehicle 1 at a point P2 and the traffic congestion is not high, the controller 100 may search for a position where the vehicle 1 is allowed to be stopped, without immediately performing the emergency stop of the vehicle 1.

As illustrated in FIG. 8, when the controller 100 controls the vehicle 1 to stop at a point P3 and thus the vehicle 1 is emergency stopped at the point P3 in a state in which a curvature of the road where the vehicle 1 is driving has a part having a curvature equal to or greater than the preselected curvature, there may be the risk of collision between the vehicle 1 and other vehicle driving in the rear on the same lane.

That is, when the vehicle 1 is emergency stopped at the point P3 in a state in which the driving road has the curved road, the other vehicle driving in the rear may be collided with the vehicle 1 since the other vehicle does not find the stopped vehicle 1, and thus it may be appropriate that the vehicle 1 is stopped at a position out of the curved road.

The curvature of the road where the vehicle 1 is driving may be calculated based on a radius (r) of curvature, and as the radius (r) of curvature is increased, the curvature of the road may be reduced. Therefore, the controller 100 may determine whether the curvature of the road is less than the preselected curvature based on the radius of curvature of the road where the vehicle 1 is driving, and the controller 100 may control the vehicle 1 so that the vehicle 1 is stopped at a position, which allows the road having a curvature less than the preselected curvature to be obtained by the preselected distance in the rear of the vehicle 1.

As illustrated in FIG. 8, when the road having the curvature less than the preselected curvature is obtained by a preselected distance d1 in the rear of the vehicle 1, the controller 100 may perform the driving stop control to stop the vehicle 1 (1080). That is, when the vehicle 1 is placed at a point P4, the risk of collision between the vehicle 1 and the other vehicle driving in the rear of the vehicle 1 may be reduced since the straight road is obtained by the preselected distance d1 in the rear of the vehicle 1.

Therefore, despite detecting that the driver is incapable of controlling the vehicle 1, the controller 100 may control the vehicle 1 to pass through the road having the curvature equal to or greater than the preselected curvature by controlling smart cruise control system, without immediately stopping the vehicle 1.

That is, the controller 100 may control the vehicle 1 such that the vehicle 1 drives to the point P4 by passing through the point P3. When the vehicle 1 reaches the point P4 and the straight road having the curvature less than the preselected curvature is obtained by the preselected distance in the rear of the vehicle 1, the controller 100 may control the vehicle 1 such that the vehicle is stopped. Accordingly, it may be possible for the vehicle 1, in which its driver is incapable of controlling the vehicle 1, to stop at the point P4 (1090).

As illustrated in FIG. 9, when the driver is incapable of driving the vehicle 1 in a state in which the road where the vehicle is driving is the general road (Rn), the controller 100 may search for a stop position for the vehicle 1(1100) and the controller 100 may control the driving stop of the vehicle 1 to be stopped at an intersection of the general road.

That is, a case, in which driver is incapable of controlling the vehicle 1, may be caused by the problem in the health. Therefore, the controller 100 may control the vehicle 1 to be stopped at the intersection so that the driver's health issue is immediately found and the first aid is easily performed after the vehicle 1 is stopped.

The controller 100 may determine whether the vehicle 1 driving on the general road is allowed to be stopped at the intersection or not, based on the traffic conditions of the road and the existence of obstacles such as other vehicles (1110). When it is identified that the vehicle 1 is allowed to be stopped at the intersection, the controller 100 may start the driving stop control of the vehicle 1 so that the vehicle 1 is stopped at the intersection (1120), and thus the vehicle 1 may be stopped at the intersection (1130).

On the other hand, when it is identified that the vehicle 1 is not allowed to be stopped at the intersection, the controller 100 may put off the stop timing without immediately starting the driving stop control of the vehicle 1 that is driving, and search for a position for emergency stop of the vehicle 1 by considering the shape of the road where the vehicle 1 is driving, and the driving environment.

Particularly, the controller 100 may determine whether a curvature of the general road (Rn) where the vehicle 1 is driving is less than a preselected curvature (1140), and when it is identified that the curvature of the road is equal to or greater than the preselected curvature, the controller 100 may search for other position where the vehicle 1 is allowed to be stopped, without stopping the vehicle 1 (1150).

On the other hand, when it is identified that the curvature of the general road (Rn) is less than the preselected curvature, the controller 100 may determine whether a road having a curvature less than the preselected curvature is obtained by a preselected distance in the rear of the vehicle 1 (1160)

As mentioned in FIG. 8, when the vehicle 1 is emergency stopped on the road having the large curvature in a state in which the driver is incapable of controlling the vehicle 1 during the vehicle 1 is driving on the general road (Rn), the risk of collision with other vehicle may be increased. Therefore, in order to prevent the rear-end collision and the secondary accident, the controller 100 may put off the driving stop control timing until a road having a small curvature or a straight road is obtained by a preselected distance.

Referring to FIG. 10, although the driver is incapable of controlling the vehicle 1 at a point P5 during the vehicle 1 is driving on the general road (Rn), when it is impossible to stop the vehicle 1 at the intersection since there is no intersection around the vehicle 1, the controller 100 may search for a position for the emergency stop of the vehicle 1 by considering the shape of the road where the vehicle 1 is driving, and the driving environment, without immediately starting the driving stop control of the vehicle 1.

As illustrated in FIG. 7, when the traffic congestion around the vehicle 1 is high, the controller 100 may immediately start the driving stop control of the vehicle 1, but when the traffic congestion is low, the controller 100 may put off the stop timing of the vehicle 1 by considering the shape of the road and the driving environment without immediately starting the driving stop control of the vehicle 1.

As illustrated in FIG. 10, when a curvature of the general road (Rn) where the vehicle 1 is driving has a part having a curvature equal to or greater than the preselected curvature, the controller 100 may control the vehicle 1 so that the vehicle 1 is stopped at a position, which allows the road having a curvature less than the preselected curvature to be obtained by the preselected distance in the rear of the vehicle 1, in the same manner as FIG. 8.

That is, despite determining that the driver is incapable of controlling the vehicle 1, the controller 100 may control the vehicle 1 to pass through the road having the curvature equal to or greater than the preselected curvature, by controlling smart cruise control system, without immediately stopping the vehicle 1.

Under control of the controller 100, the vehicle 1 may drive to a point P6 by passing through the curved road. Although the vehicle 1 reaches the point P6 and the straight road having the curvature less than the preselected curvature is obtained by a particular distance d2 in the rear of the vehicle 1, when the particular distance d2 is less than a reference distance for emergency stop of the vehicle 1, the controller 100 may maintain the vehicle 1 to drive without stopping the vehicle 1 and search for a position where the vehicle 1 is allowed to be stopped.

Under control of the controller 100, the vehicle 1 may drive to a point P7 by passing through the point 6 and the curved road.

When the vehicle 1 reaches the point P7 and the straight road having the curvature less than the preselected curvature is obtained by the particular distance d1 in the rear of the vehicle 1 and the particular distance d1 is equal to or greater than the reference distance for the emergency stop of the vehicle 1, the controller 100 may start the driving stop control of the vehicle 1 so that the vehicle 1 is stopped (1080). Accordingly, it may be possible for the vehicle 1, in which its driver is incapable of controlling the vehicle 1, to be stopped at the point P7 (1090).

That is, when the vehicle 1 is placed at the point P7, the risk of collision between the vehicle 1 and the other vehicle driving in the rear of the vehicle 1 may be reduced since the straight road is obtained in the rear of the vehicle 1 by the particular distance d1.

As described above, according to the vehicle 1 and the control method of the vehicle 1, it may be possible to perform the emergency stop of the vehicle 1 by considering the traffic conditions and the shape of the road when the driver is incapable of driving the vehicle 1 during driving the vehicle 1, and thus it may be possible to maintain the lane and to secure the safety of other vehicle in the rear of the vehicle 1 even when the emergency situation occurs.

As is apparent from the above description, according to the proposed vehicle and control method thereof, by controlling the vehicle so as to perform an emergency stop depending on the traffic conditions and the shape of the road when the driver is incapable of driving, it may be possible to maintain the lane and to secure the safety of other vehicles in the rear of the vehicle even when the emergency situation occurs.

Although certain embodiments of the present disclosure have been shown and described, it would be appreciated by those skilled in the art that changes may be made in these embodiments without departing from the principles and spirit of the disclosure, the scope of which is defined in the claims and their equivalents.

DESCRIPTION OF SYMBOLS

1: vehicle
70: speed regulator
80: speed detector
90: storage
100: controller
200: sensor
303: display
304: indicator
318: input
331: driver state detector
350: imager

What is claimed is:

1. A vehicle comprising:
a sensor configured to detect an object in a vicinity of the vehicle;
a driver state detector configured to identify a driver state of a driver of the vehicle; and
a controller operably coupled to the sensor and the driver state detector, the controller configured to determine whether the driver is incapable of controlling the vehicle based on the identified driver state, and to determine a driving stop position and a driving stop timing based on at least one of a type of a road on which the vehicle is driving and a driving environment of the vehicle when it is determined that the driver is incapable of controlling the vehicle,
wherein the controller configured to control a driving of the vehicle, which is in a deceleration, for determining the driving stop position, to prevent from crossing into another lane in response to identifying that the driver is incapable of controlling the vehicle.

2. The vehicle of claim 1, wherein
the driver state detector is further configured to acquire gaze information of the driver, and
the controller is further configured to determine a risk of inattention by the driver with respect to a road ahead of the vehicle based the acquired gaze information, and to determine a vehicle control state of the driver based on the determined risk.

3. The vehicle of claim 1, further comprising:
an imager configured to image the road on which the vehicle is driving,
wherein the controller is further configured to determine whether the road on which the vehicle is driving is an expressway or a general road based on map information of the road on which the vehicle is driving or imaged road information generated by the imager.

4. The vehicle of claim 1, wherein
the controller is further configured to identify the driving environment of the vehicle based on at least one of traffic congestion of the road on which the vehicle is driving and a shape of the road on which the vehicle is driving.

5. The vehicle of claim 4, wherein
the controller is further configured to detect the traffic congestion based on whether a number of other vehicles in the vicinity of the vehicle, as detected by the sensor, is greater than or equal to a preselected number, and to determine a driving stop control timing of the vehicle based on the detected traffic congestion.

6. The vehicle of claim 5, wherein
the controller is further configured to perform driving stop control of the vehicle when the number of other vehicles in the vicinity of the vehicle is greater than or equal to the preselected number, and to determine the driving stop control timing of the vehicle based on the shape of road on which the vehicle is driving when the number of other vehicles in the vicinity of the vehicle is less than the preselected number.

7. The vehicle of claim 1, wherein
the controller is further configured to determine whether a curvature of the road on which the vehicle is driving is less than a preselected curvature, and to perform the driving stop control of the vehicle when the curvature of the road on which the vehicle is driving is less than the preselected curvature.

8. The vehicle of claim 3, wherein
the controller is further configured to perform driving stop control of the vehicle, causing the vehicle to stop at an intersection, when the road on which the vehicle is driving is a general road.

9. A method for controlling a vehicle comprising:
detecting an object in a vicinity of the vehicle using a sensor;
identifying a driver state of a driver of the vehicle using a driver state detector;
determining, by a controller operably coupled to the sensor and the driver state detector, whether the driver is incapable of controlling the vehicle based on the identified driver state; and
determining, by the controller, a driving stop position and a driving stop timing based on at least one of a type of a road on which the vehicle is driving and a driving environment of the vehicle when it is determined that the driver is incapable of controlling the vehicle,
wherein the determination of the driving stop position of the vehicle includes controlling a driving of the vehicle, which is in a deceleration, for determining the driving stop position, to prevent from crossing into another lane in response to identifying that the driver is incapable of controlling the vehicle.

10. The method of claim 9, further comprising:
acquiring gaze information of the driver using the driver state detector; and
determining, by the controller, a risk of inattention by the driver with respect to a road ahead of the vehicle based the acquired gaze information, and to determine a vehicle control state of the driver based on the determined risk.

11. The method of claim 9, further comprising:
imaging the road on which the vehicle is driving using an imager; and
determining, by the controller, whether the road on which the vehicle is driving is an expressway or a general road based on map information of the road on which the vehicle is driving or imaged road information generated by the imager.

12. The method of claim 9, further comprising:
identifying, by the controller, the driving environment of the vehicle based on at least one of traffic congestion of the road on which the vehicle is driving and a shape of the road on which the vehicle is driving.

13. The method of claim 12, further comprising:
detecting, by the controller, the traffic congestion based on whether a number of other vehicles in the vicinity of the vehicle, as detected by the sensor, is greater than or equal to a preselected number; and
determining, by the controller, a driving stop control timing of the vehicle based on the detected traffic congestion.

14. The method of claim 13, further comprising:
performing, by the controller, driving stop control of the vehicle when the number of other vehicles in the vicinity of the vehicle is greater than or equal to the preselected number; and
determining, by the controller, the driving stop control timing of the vehicle based on the shape of road on which the vehicle is driving when the number of other vehicles in the vicinity of the vehicle is less than the preselected number.

15. The method of claim 9, further comprising:
determining, by the controller, whether a curvature of the road on which the vehicle is driving is less than a preselected curvature; and
performing, by the controller, the driving stop control of the vehicle when the curvature of the road on which the vehicle is driving is less than the preselected curvature.

16. The method of claim 11, further comprising:
performing, by the controller, driving stop control of the vehicle, causing the vehicle to stop at an intersection, when the road on which the vehicle is driving is a general road.

* * * * *